(12) United States Patent  
Park et al.

(10) Patent No.: US 9,190,863 B2  
(45) Date of Patent: Nov. 17, 2015

(54) APPARATUS AND METHOD FOR CHARGING BATTERY BY LOWERING CHARGE POWER IN PHASE

(71) Applicant: LG CHEM, LTD., Seoul (KR)

(72) Inventors: Kyu-Ha Park, Seoul (KR); Cheol-Taek Kim, Daejeon (KR)

(73) Assignee: LG CHEM, LTD., Seoul (KR)

( * ) Notice: Subject to any disclaimer, the term of this patent is extended or adjusted under 35 U.S.C. 154(b) by 116 days.

(21) Appl. No.: 14/089,308

(22) Filed: Nov. 25, 2013

(65) Prior Publication Data

US 2014/0084851 A1    Mar. 27, 2014

Related U.S. Application Data

(63) Continuation of application No. PCT/KR2012/008043, filed on Oct. 4, 2012.

(30) Foreign Application Priority Data

Oct. 4, 2011    (KR) .................. 10-2011-0100664  
Oct. 4, 2012    (KR) .................. 10-2012-0110116

(51) Int. Cl.
*H01M 10/44*    (2006.01)  
*H01M 10/46*    (2006.01)  
(Continued)

(52) U.S. Cl.  
CPC . *H02J 7/007* (2013.01); *H02J 7/04* (2013.01); *H02J 7/045* (2013.01); *Y02B 40/90* (2013.01)

(58) Field of Classification Search  
CPC .. H02J 2007/0049; H02J 7/008; H02J 7/0081  
USPC ......... 320/107, 112, 114, 124, 125, 128, 148, 320/152, 160, 162  
See application file for complete search history.

(56) References Cited

U.S. PATENT DOCUMENTS 5,367,244 A    11/1994  Rose et al.  
5,808,447 A    9/1998   Hagino  
(Continued)

FOREIGN PATENT DOCUMENTS

EP    2 068 420 A2    6/2009  
JP    11-136876 A     5/1999  
(Continued)

OTHER PUBLICATIONS

International Search Report, issued in PCT/KR2012/008043, dated, Mar. 25, 2013.

*Primary Examiner* — Edward Tso  
(74) *Attorney, Agent, or Firm* — Birch, Stewart, Kolasch & Birch, LLP (57) ABSTRACT

Disclosed is an apparatus (and method) for charging a battery having a voltage measuring unit for measuring a voltage, a control unit for outputting a charge control signal corresponding to an early charging mode in which the battery is charged until a voltage of the battery rises to a preset cut-off voltage (Vc) and a charge control signal corresponding to a late charging mode in which the battery is charged while lowering a charge power in phases, and a charging unit for providing a charge power corresponding to the charge control signal to the battery, wherein a point of lowering the charge power in phases is associated with a point at which the voltage of the battery reaches the cut-off voltage again by the lowered charge power. Therefore, a voltage level reached at full charge of a battery may be raised in a simple and efficient way.

31 Claims, 3 Drawing Sheets

(51) Int. Cl.
*H02J 7/00* (2006.01)
*H02J 7/04* (2006.01)

(56) References Cited

U.S. PATENT DOCUMENTS

| | | | |
|---|---|---|---|
| 7,525,290 B2 * | 4/2009 | Miyata | 320/160 |
| 2007/0278991 A1 | 12/2007 | Miyata | |
| 2008/0054847 A1 * | 3/2008 | Elias et al. | 320/130 |
| 2008/0203969 A1 | 8/2008 | Kurihara et al. | |
| 2012/0112700 A1 | 5/2012 | Morimoto et al. | |

FOREIGN PATENT DOCUMENTS

| | | |
|---|---|---|
| JP | 11-252702 A | 9/1999 |
| JP | 2003-87991 A | 3/2003 |
| JP | 2006-114312 A | 4/2006 |
| JP | 2008-10295 A | 1/2008 |
| JP | 2009-44946 A | 2/2009 |
| JP | 2012-178899 A | 9/2012 |
| KR | 10-2000-0019006 A | 4/2000 |
| KR | 10-2007-0113100 A | 11/2007 |
| WO | WO 2011/004550 A1 | 1/2011 |

* cited by examiner

APPARATUS AND METHOD FOR CHARGING BATTERY BY LOWERING CHARGE POWER IN PHASE

CROSS-REFERENCE TO RELATED APPLICATION

The present application is a continuation of International Application No. PCT/KR2012/008043 filed on Oct. 4, 2012, which claims priority to Korean Patent Application No. 10-2011-0100664 filed on Oct. 4, 2011 and Korean Patent Application No. 10-2012-0110116 filed on Oct. 4, 2012 in the Republic of Korea, the disclosures of which are incorporated herein by reference.

TECHNICAL FIELD

The present disclosure relates to an apparatus and method for charging a battery, and more particularly to an apparatus and method capable of effectively raising a voltage level reached at full charge of a battery by improving a charging algorithm.

BACKGROUND ART

Recently, the demand for portable electronic products such as notebooks, video cameras, cellular phones or the like is rapidly increasing, and electric vehicles (EV), hybrid electric vehicles (HEV), energy storage batteries, robots, satellites or the like are developed in earnest. Accordingly, a high-performance secondary battery allowing repeated charging/discharging is actively studied.

Secondary batteries commercially used at the present include nickel-cadmium batteries, nickel-hydrogen batteries, nickel-zinc batteries, lithium secondary batteries or the like, among which the lithium secondary batteries are in the limelight due to their very low self-discharge ratio, high energy density and free charging/discharging since a memory effect does not substantially occur in comparison to nickel-based secondary batteries.

Such a secondary battery is charged to operate within an operation voltage. An operation voltage of a general lithium secondary battery is in a range of 3.7V to 4.2V. Therefore, when the secondary battery is fully charged, the secondary battery has an open circuit voltage of 4.2V. However, a secondary battery is not always charged under the same condition. In other words, a secondary battery may be charged while being connected to a load or supplying power to a load. For example, a battery loaded on a hybrid electric vehicle may receive a charge power from an engine together with supplying power to a vehicle-driving motor. Like this, if a voltage of a secondary battery is measured while the secondary battery is being connected to a load or charged/discharged, it is impossible to measure an accurate voltage of the secondary battery due to the load effect. As a result, when charging a secondary battery connected to a load, it is difficult to check whether the secondary battery reaches full charge by only measuring a voltage of the secondary battery.

In order to solve this problem, an algorithm for charging a battery based on a state of charge (SOC) has been proposed. When a secondary battery supplies power to a load, a current supplied from the secondary battery to the load is measured, and then the measured currents are added and stored as a total discharge quantity. After that, during a charging process, the secondary battery is not charged based on the voltage of the secondary battery, but fully charged by a charge current supplied as much as the total discharge quantity. However, this technique has problems in that as the number of charging/discharging processes increases, due to the accumulation of SOC measurement errors caused during the charging/discharging processes, it becomes more difficult to reach full charge. Therefore, there is needed a new charging algorithm capable of achieving full charge.

DISCLOSURE

Technical Problem

The present disclosure is designed to solve the problems of the related art, and therefore the present disclosure is directed to providing an apparatus and method capable of efficiently charging a battery in a simple way.

Technical Solution

In one aspect of the present disclosure, there is provided an apparatus for charging a battery, which includes a voltage measuring unit for measuring a voltage of a battery; a control unit for outputting a charge control signal corresponding to an early charging mode in which the battery is charged until a voltage of the battery rises to a preset cut-off voltage Vc and a charge control signal corresponding to a late charging mode in which the battery is charged while lowering a charge power in phases; and a charging unit for providing a charge power corresponding to the charge control signal to the battery, wherein a point of lowering the charge power in phases is associated with a point at which the voltage of the battery reaches the cut-off voltage again by the lowered charge power.

According to the present disclosure, the cut-off voltage Vc may be set higher than an open circuit voltage when the battery is fully charged. Preferably, the cut-off voltage Vc may be set so that an open circuit voltage when the battery finishes charging is 95% or above an open circuit voltage when the battery is fully charged.

According to the present disclosure, the early charging mode may charge the battery by means of a constant-power manner, a constant-current manner, a constant-voltage manner, or their mixtures.

Meanwhile, in the late charging mode, a phased decrement $\Delta P$ of the charge power may be set to be ⅕ or below a charge power CP0 applied when the early charging mode terminates.

In addition, in the late charging mode, a phased decrement $\Delta P$ of the charge power may be set to be constant or may be set to proportionally increase or decrease.

According to the present disclosure, the late charging mode may terminate when a charge power level at the present point, which has been lowered in phases, reaches a preset critical value. For example, the critical value may be set to be 0 W.

The apparatus for charging a battery according to the present disclosure may further include a memory unit that stores the cut-off voltage, the phased decrement of the charge power, and a charge power condition when the late charging mode terminates.

The apparatus for charging a battery according to the present disclosure may be one component of a battery driving system which includes a battery and a load for receiving power from the battery.

The battery driving system may be an electric vehicle (EV), a hybrid electric vehicle (HEV), an electric bike (E-Bike), a power tool, an energy storage system, an uninterruptable power supply (UPS), a portable computer, a cellular phone, a portable audio device, a portable video device or the like, and the load may be a motor for giving a rotating force by the power supplied by the battery or a power conversion circuit for converting the power supplied by the battery into power required by various circuit parts.

The apparatus for charging a battery according to the present disclosure may be one component of a battery pack which includes a cell assembly in which a plurality of battery cells is connected in series or in parallel and a battery management system (BMS) for controlling charging/discharging of the cell assembly.

In this case, the battery charging apparatus may be integrated with the BMS or configure a separate circuit device.

In another aspect of the present disclosure, there is also provided a method for charging a battery, which includes an early charging stage in which a battery is charged until a voltage of the battery rises to a preset cut-off voltage Vc; and a late charging stage in which the battery is charged while lowering a charge power in phases, wherein a point of lowering the charge power in phases is associated with a point at which the voltage of the battery reaches the cut-off voltage again by the lowered charge power.

Advantageous Effects

According to an aspect of the present disclosure, it is possible to raise a voltage level reached at full charge of a battery in a simple and efficient way.

According to another aspect of the present disclosure, a voltage level reached at full charge of a battery may be raised by setting a cut-off voltage Vc and a phased charge power decrement $\Delta P$ in consideration of characteristics of a battery to be charged, service environments or the like.

According to another aspect of the present disclosure, since a charging process is not performed based on a measurement error which may occur during repeated charging processes, a voltage level reached at full charge of a battery may be raised regardless of the number of charging processes.

DESCRIPTION OF DRAWINGS

The accompanying drawings illustrate preferred embodiments of the present disclosure and, together with the foregoing disclosure, serve to provide further understanding of the technical spirit of the present disclosure. However, the present disclosure is not to be construed as being limited to the drawings in which.

BEST MODE

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation. Therefore, the description proposed herein is just a preferable example for the purpose of illustrations only, not intended to limit the scope of the disclosure, so it should be understood that other equivalents and modifications could be made thereto without departing from the spirit and scope of the disclosure.

First, a battery charging apparatus 100 according to an embodiment of the present disclosure will be described.

Figure 1:
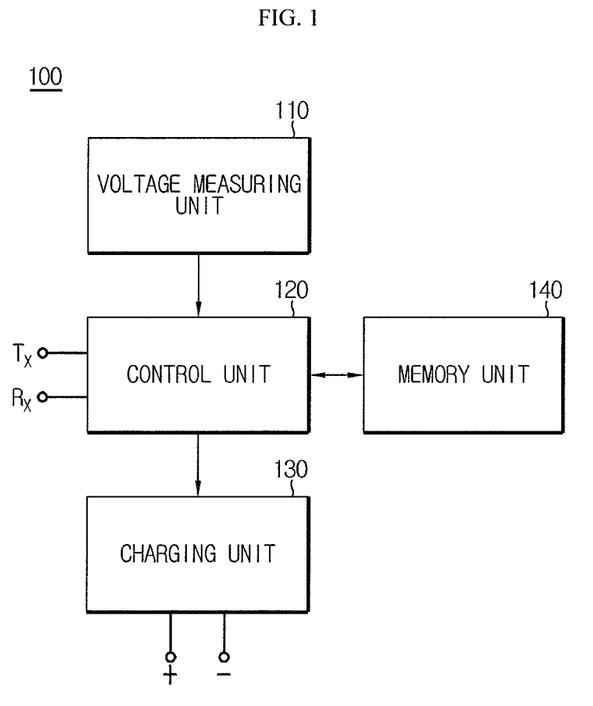
FIG. 1 is a block diagram schematically showing a functional configuration of an apparatus for charging a battery according to an embodiment of the present disclosure.

FIG. 1 is a block diagram schematically showing a functional configuration of a battery charging apparatus 100 according to an embodiment of the present disclosure.

Referring to FIG. 1, the battery charging apparatus 100 according to an embodiment of the present disclosure includes a voltage measuring unit 110, a control unit 120 and a charging unit 130.

The voltage measuring unit 110 measures a voltage of a battery while the battery is being charged. The technique for measuring a voltage of a battery is well known in the art and thus not described in detail here.

The control unit 120 controls the charging unit 130 by means of an early charging mode and a late charging mode. The early charging mode is a charging mode in which a battery is initially charged with a preset early charge power until a voltage of the battery measured by the voltage measuring unit 110 rises to a preset cut-off voltage Vc. The late charging mode is a charging mode in which the battery is charged while lowering a late charge power in phases based on the charge power when the early charging mode terminates. The control unit 120 outputs charge control signals corresponding to both charging modes to the charging unit 130.

The charging unit 130 provides a charge power, which corresponds to the charge control signal output by the control unit 120, to the battery. For this, the charging unit 130 is electrically coupled to a power supply unit (not shown) which supplies power required for generation of a charge power. The power supply unit may be, for example, a common electrical grid, a bulk power storage device, a generator or the like, but the present disclosure is not limited thereto. The charging technique for giving a charge power of a certain magnitude to a battery is already well known in the art and thus not described in detail here.

Hereinafter, the early charging mode and the late charging mode will be described in more detail with reference to FIGS. 2 and 3.

Figure 2:
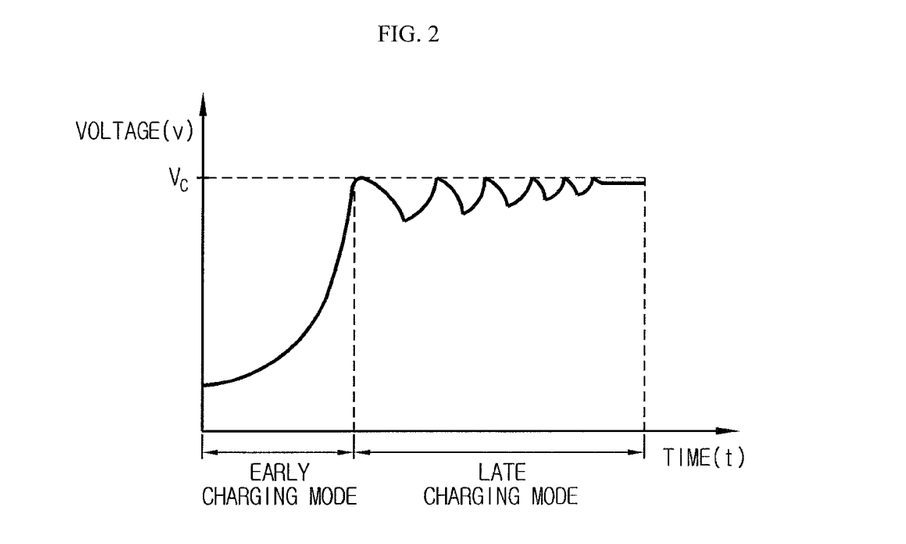
FIG. 2 is a graph showing a voltage profile of a battery in an early charging mode and a late charging mode according to an embodiment of the present disclosure.
Figure 3:
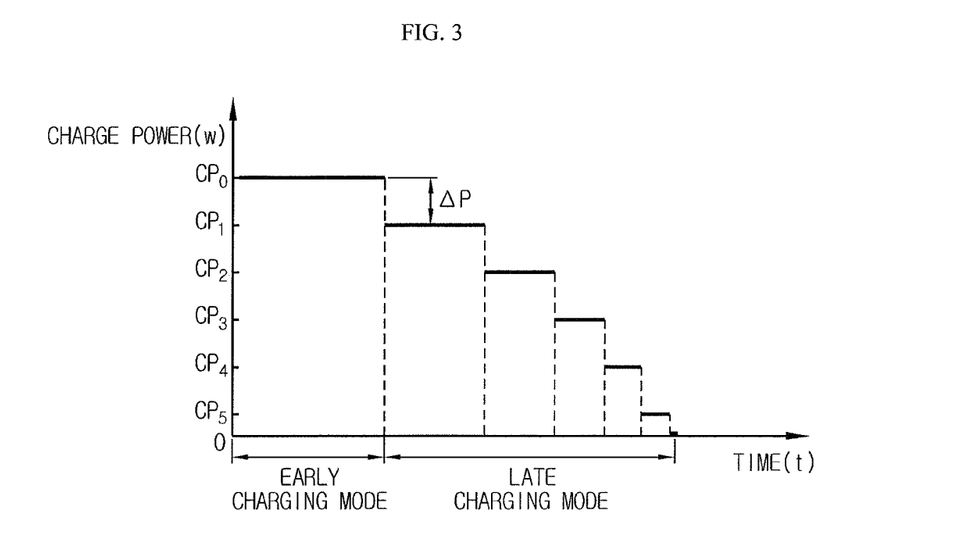
FIG. 3 is a graph showing a variation profile of a charge power in the early charging mode and the late charging mode according to an embodiment of the present disclosure.

FIGS. 2 and 3 are graphs showing a voltage profile of a battery and a variation profile of a charge power according to an early charging mode and a late charging mode, respectively.

First, in the early charging mode, the control unit 120 controls the charging unit 130 so that the battery is charged with a preset early charge power CP0. The early charge power CP0 may be set in various ways according to characteristics of a battery to be charged and user requirements. Therefore, the early charging mode may be performed by means of a constant-power manner, a constant-current manner, a constant-voltage manner, or their mixtures.

Even though FIGS. 2 and 3 show a case in which the battery is charged with the early charge power CP0 in a constant-power manner, it is obvious that the early charge power CP0 may have a fixed magnitude or a varying magnitude during a charging process depending on the charging manner. In addition, in the early charging mode, the control unit 120 controls so that the battery is charged until a voltage of the battery measured by the voltage measuring unit 110 rises to a preset cut-off voltage Vc.

According to the present disclosure, the cut-off voltage Vc is set higher than an open circuit voltage when the battery is fully charged. This considers that a voltage of a battery during a charging process is higher than an open circuit voltage. If the cut-off voltage Vc is set higher than the open circuit voltage when the battery is fully charged as described above, a voltage reached at full charge may be raised more efficiently.

Preferably, the cut-off voltage Vc may be set so that an open circuit voltage of the battery when the battery finishes charging is 95% or above an open circuit voltage when the battery is fully charged. According to the present disclosure, an open circuit voltage when the battery finishes charging varies according to a set value of the cut-off voltage Vc. Therefore, various cut-off voltages Vc may be set for a battery to be actually used, and actual charging experiments may be performed according to various cut-off voltages Vc to obtain various open circuit voltages when the battery finishes charging. At this time, among the various open circuit voltages when the battery finishes charging, obtained through experiments, an open circuit voltage when the battery finishes charging corresponding to 95% or above the open circuit voltage when the battery is fully charged may be found. Therefore, a cut-off voltage Vc corresponding to the open circuit voltage when the battery finishes charging, which is 95% or above the open circuit voltage when the battery is fully charged, may be set as a cut-off voltage Vc of the present disclosure.

As described above, the cut-off voltage Vc may be set variously according to characteristics of a battery to be charged and user requirements. If the cut-off voltage Vc is set variously according to characteristics of the battery, a voltage reached at full charge may be raised more efficiently.

Next, in the late charging mode, the control unit 120 controls the charging unit 130 so that the battery is charged while lowering a charge power in phases based on the charge power at the point when the early charging mode terminates. At this time, the point of lowering a charge power in phases is associated with a point at which a voltage of the battery measured by the voltage measuring unit 110 reaches the cut-off voltage Vc by the lowered charge point.

In more detail, if a voltage of the battery charged with the early charge power CP0 reaches the cut-off voltage Vc, the control unit 120 controls the charging unit 130 so that the battery is charged with a late charge power CP1, which is obtained by lowering as much as a preset decrement ΔP from the charge power CP0 at the point when the early charging mode terminates. If the charging unit 130 charges the battery with the late charge power CP1 so that the voltage of the battery reaches the cut-off voltage Vc again, the control unit 120 controls the charging unit 130 again so that the battery is charged with a late charge power CP2 which is obtained by lowering as much as a preset decrement ΔP from the late charge power CP1. The process of lowering a charge power in phases in association with the cut-off voltage Vc repeats until a level of the charge power decreases to a preset critical value.

When outputting a charge control signal to the charging unit 130 in order to lower the late charge power in phases, the control unit 120 may output to the charging unit 130 a charge control signal for lowering a charge voltage, lowering a charge current, or lowering both the charge voltage and the charge current.

For example, whenever the voltage of the battery reaches the cut-off voltage Vc, the charge voltage output from the charging unit 130 may be gradually lowered to approach the cut-off voltage Vc, and simultaneously a charge current output from the charging unit 130 may also be gradually lowered. At this time, the control unit 120 outputs the charge control signal so that a multiplication of the lowered charge voltage and the lowered charge current corresponds to the preset charge power decrement ΔP.

As another example, whenever the voltage of the battery reaches the cut-off voltage Vc, the charge voltage output from the charging unit 130 may be raised, and simultaneously the charge current output from the charging unit 130 may be gradually lowered. At this time, the increment of the charge voltage may be suitably set for good charging in consideration of the cut-off voltage Vc of the battery or an estimated present charge quantity of the battery. In other words, as the late charging continues to perform, the charge quantity of the battery will increase. At this time, even if charging is not stopped and the open circuit voltage of the battery is not directly measured, the estimated open circuit voltage of the battery will still rise gradually. Therefore, the control unit 120 may output a charge control signal so that a voltage difference between the charging unit 130 and the battery may be maintained. Here, the control unit 120 outputs the charge control signal so that a multiplication of the raised charge voltage and the lowered charge current corresponds to the preset charge power decrement ΔP. At this time, the increment of the charge voltage may be preset and stored in the memory unit 140. If the charge power is controlled as above, the open circuit voltage of when the battery is fully charged may be increased to the maximum available voltage range of the battery.

FIGS. 2 and 3 show an example in which a charge power is lowered six times by the same level based on the charge power CP0 when the early charging mode terminates, thereby terminating the late charging mode when the charge power becomes 0 W. However, the phased decrement ΔP of the charge power and the critical value of the charge power at which the late charging mode terminates may be set variously according to characteristics of the battery.

Meanwhile, in the embodiment depicted in FIG. 2, if the voltage of the battery reaches the cut-off voltage Vc, the charging process is interrupted for a moment, and then the battery is charged again after the voltage of the battery is stabilized. Generally, a voltage of a battery measured during a charging process is higher than an open circuit voltage (OCV) of the battery, and if the charging process is interrupted, the battery voltage is slightly lowered while the voltage of the battery is stabilized. FIG. 2 is to facilitate understanding of the voltage of the battery reaching the preset cut-off voltage Vc again, and in this embodiment, a short suspension period is given if the voltage of the battery reaches the cut-off voltage Vc. However, in the present disclosure, a battery may be charged without any suspension period after a voltage of the battery reaches the cut-off voltage Vc, or a battery may also be charged with a shorter suspension period than the embodiment of FIG. 2. Therefore, the present disclosure is not limited to the embodiment depicted in FIG. 2.

Preferably, the phased decrement ΔP of the charge power is ⅕ or below the charge power CP0 applied when the early charging mode terminates. In addition, the phased decrement ΔP of the charge power may be constant or may proportionally increase or decrease.

Meanwhile, the battery charging apparatus 100 according to the present disclosure may further include a memory unit 140 which stores the cut-off voltage Vc, the phased decrement ΔP of the charge power, and the charge power condition (critical value) when the late charging mode terminates.

The memory unit 140 may be a semiconductor element such as RAM, ROM, EEPROM, which is well known in the art as a unit capable of recording or erasing data, or a mass storage medium such as a hard disk, but the present disclosure is not limited thereto.

The control unit 120 may be a microprocessor capable of executing program codes for performing a dualized charging mode according to the present disclosure. As an alternative, the control unit 120 may be a semiconductor chip which implements control flows of the dualized charging mode according to the present disclosure as logic circuits. However, the present disclosure is not limited thereto.

The battery charging apparatus according to the present disclosure may be one component of a battery driving system which includes a battery and a load supplied with power from the battery.

The battery driving system may be, for example, an electric vehicle (EV), a hybrid electric vehicle (HEV), an electric bike (E-Bike), a power tool, an energy storage system, an uninterruptable power supply (UPS), a portable computer, a cellular phone, a portable audio device, a portable video device or the like, and the load may be, for example, a motor for giving a rotating force by the power supplied by the battery or a power conversion circuit for converting the power supplied by the battery into power required by various circuit parts.

Further, the battery charging apparatus according to the present disclosure may be one component of a battery pack which includes a cell assembly in which a plurality of battery cells is connected in series or in parallel and a battery management system (BMS) for controlling charging/discharging of the cell assembly. In this case, the battery charging apparatus may be integrated with the BMS or configure a separate circuit device.

Hereinafter, a method for charging a battery according to an embodiment of the present disclosure will be described. Regarding the method for charging a battery according to the present disclosure, any component or operation already described in detail in relation to the battery charging apparatus 100 will not be described again.

The method for charging a battery according to the present disclosure includes an early charging stage and a late charging stage. The early charging stage is a stage in which a battery is charged until a voltage of the battery rises to the preset cut-off voltage Vc, and the late charging stage is a state in which the battery is charged while lowering the charge power in phases. At this time, a point of lowering the charge power in phases is associated with a point at which the voltage of the battery reaches the cut-off voltage Vc again by the lowered charge power.

The method for charging a battery according to the present disclosure will be described with reference to FIGS. 1 and 4.

Figure 4:
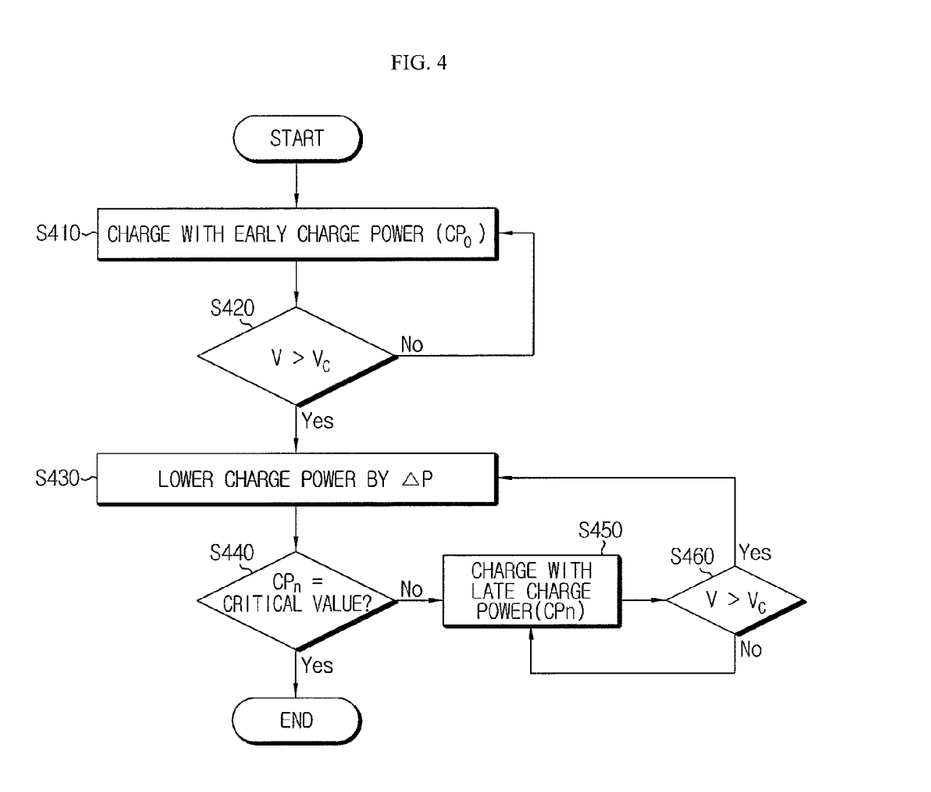
FIG. 4 is a schematic flowchart for illustrating a method for charging a battery according to an embodiment of the present disclosure.

FIG. 4 is a schematic flowchart for illustrating a method for charging a battery according to an embodiment of the present disclosure. In FIG. 4, Steps S410 and S420 correspond to the early charging stage, and Steps S430 to S460 correspond to the late charging stage.

Referring to FIG. 4, first, in S410 of the early charging stage, the control unit 120 controls the charging unit 130 so that the battery is charged with a preset early charge power. The early charging stage may use a constant-power manner, a constant-current manner, a constant-voltage manner, or their mixtures.

Next, in Step S420, the control unit 120 determines whether the voltage of the battery measured by the voltage measuring unit 110 rises to the preset cut-off voltage Vc. If the voltage of the battery does not reach the cut-off voltage Vc, the process returns to Step S410 and continues the charging process. Meanwhile, if the voltage of the battery reaches the cut-off voltage Vc, the early charging stage terminates and the process proceeds to Step S430 of the late charging stage.

In S430 of the late charging stage, the control unit 120 lowers the charge power at the point when the early charging mode terminates by a preset phased charge power decrement $\Delta P$. The phased charge power decrement $\Delta P$ may be constant or may proportionally increase or decrease.

In addition, the process proceeds to Step S440 to determine whether the charge power lowered in Step S430 reaches the critical value. If the lowered charge power reaches the critical value, the charging process terminates. Meanwhile, if the lowered charge power does not reach the critical value, the process proceeds to Step S450.

In Step S450, the control unit 120 outputs a control signal corresponding to the lowered charge power, namely the late charging stage, to the charging unit 130 and thus controls the charging unit 130 so that the battery is charged with a late charge power CPn.

Next, in Step S460, the control unit 120 determines whether the voltage of the battery measured by the voltage measuring unit 110 rises to the preset cut-off voltage Vc. If the voltage of the battery does not reach the cut-off voltage Vc, the process returns to Step S450 to continue the charging process. Meanwhile, if the voltage of the battery reaches the cut-off voltage Vc, the process returns to Step S430.

As above, the control unit 120 lowers the charge power in phases and performs the late charging stage until the charge power reaches the preset critical value, and finishes the charging process if the charge power reaches the preset critical value. For example, the critical value may be 0 W.

As described above, the cut-off voltage Vc is set higher than the open circuit voltage when the battery is fully charged, and preferably, the cut-off voltage Vc may be set so that the open circuit voltage of the battery when the battery finishes charging is 95% or above the open circuit voltage when the battery is fully charged.

According to the present disclosure, in the late charging stage, the phased charge power decrement $\Delta P$ may be ⅕ or below the charge power CP0 applied when the early charging stage terminates. In addition, the phased charge power decrement $\Delta P$ may be constant or may proportionally increase or decrease.

The method for charging a battery according to the present disclosure may further include a storing step for storing the cut-off voltage Vc, the phased charge power decrement $\Delta P$, and a charge power condition when the late charging stage terminates, in the memory unit 140.

According to the present disclosure, a voltage level reached at full charge of a battery may be raised in a simple and efficient way. In addition, a voltage level reached at full charge of a battery may be raised by setting a cut-off voltage Vc and a phased charge power decrement $\Delta P$ in consideration of characteristics of a battery to be charged, service environments or the like. Further, since a charging process is not performed based on a measurement error which may occur during repeated charging processes, a voltage level reached at full charge of a battery may be raised regardless of the number of charging processes.

Experimental Example

Hereinafter, the present disclosure will be described in more detail based on an experimental example. However, this experimental example is just for illustration, and the present disclosure is not limited thereto.

First, the battery charging apparatus according to the present disclosure was connected to a fully-charged lithium secondary battery having a capacity of 43.5 Ah, and then the lithium secondary battery was placed in a chamber which was maintained at a normal temperature. After that, while constantly maintaining a charge power of 2.1 kW, the early charging mode was performed until a voltage of the battery rose to 4.135V which corresponds to the cut-off voltage Vc. Subsequently, while lowering the charge power from 2.1 kW to 0.3 kW in phases, the late charging mode was performed. At this time, the point of lowering the charge power was associated with a point at which the voltage of the battery rose to the cut-off voltage Vc by the lowered charge power. In addition, the charge power was lowered seven times in total, and the late charging mode terminated when the charge power became 0 W.

After the battery was completely charged according to the experimental conditions, the open circuit voltage of the battery was measured as 4.1253 V. Meanwhile, for the lithium secondary battery used in this experiment, the lower limit of the charging open circuit voltage corresponding to 100% of the SOC was 4.2 V. However, in order to prevent overcharging, the fully-charging open circuit voltage of the lithium secondary battery was set as 4.12 V which corresponds to 95% of the SOC, while remaining a margin of about 5%. However, after applying the battery charging method according to the present disclosure, it was found that the open circuit voltage of the battery had risen to 4.1253 V which corresponds to 95.38%. From this experiment result, it may be understood that if a battery is charged according to the present disclosure, a level of an open circuit voltage reached at full charge of a battery may be raised in a simple and efficient way, thereby enhancing the capacity of the battery.

The present disclosure has been described in detail. However, it should be understood that the detailed description and specific examples, while indicating preferred embodiments of the disclosure, are given by way of illustration only, since various changes and modifications within the spirit and scope of the disclosure will become apparent to those skilled in the art from this detailed description.

In addition, it should be understood that the components or elements of the battery charging apparatus 100 of the present disclosure shown in FIG. 1 or the like may not be physically but rather logically distinguished therebetween.

In other words, it should be interpreted that since each component or element of the battery pack according to the present invention is a logic component or element, they fall within the spirit or scope of the invention if they perform a function of a logic feature of the present invention whether they operate separately or integratedly, and even though they are named otherwise, they fall within the spirit or scope of the invention if they perform the same or similar function.

What is claimed is:

1. An apparatus for charging a battery, comprising:
   a voltage measuring unit for measuring a voltage of a battery;
   a control unit for outputting a charge control signal corresponding to an early charging mode in which the battery is charged until a voltage of the battery rises to a preset cut-off voltage (Vc) and a charge control signal corresponding to a late charging mode in which the battery is charged while lowering a charge power in phases; and
   a charging unit for providing a charge power corresponding to the charge control signal to the battery,
   wherein a point of lowering the charge power in phases is associated with a point at which the voltage of the battery reaches the cut-off voltage again by the lowered charge power,
   wherein, in the late charging mode, the control unit outputs the charge control signal for lowering both a charge voltage and a charge current or the control unit outputs the charge control signal for lowering the charge current,
   wherein, when outputting the charge control signal for lowering both the charge voltage and the charge current in the late charging mode, the control unit outputs the charge control signal so that the charge voltage approaches the cut-off voltage, and
   wherein, when outputting the charge control signal for lowering the charge current in the late charging mode, the control unit outputs the charge control signal so that the charge voltage rises according to a preset voltage range.

2. The apparatus for charging a battery according to claim 1, wherein the cut-off voltage (Vc) is set higher than an open circuit voltage when the battery is fully charged.

3. The apparatus for charging a battery according to claim 1, wherein the cut-off voltage (Vc) is set so that an open circuit voltage when the battery finishes charging is 95% or above an open circuit voltage when the battery is fully charged.

4. The apparatus for charging a battery according to claim 1, wherein in the late charging mode, a phased decrement ($\Delta P$) of the charge power is ⅕ or below a charge power (CP0) applied when the early charging mode terminates.

5. The apparatus for charging a battery according to claim 1, wherein in the late charging mode, a phased decrement ($\Delta P$) of the charge power is constant.

6. The apparatus for charging a battery according to claim 1, wherein in the late charging mode, a phased decrement ($\Delta P$) of the charge power proportionally increases or decreases.

7. The apparatus for charging a battery according to claim 1, wherein the late charging mode terminates when a charge power level at the present point, which has been lowered in phases, reaches a preset critical value.

8. The apparatus for charging a battery according to claim 7, wherein the critical value is 0 W.

9. The apparatus for charging a battery according to claim 1, wherein in the late charging mode, a phased decrement ($\Delta P$) of the charge power is constant, and
   wherein the late charging mode terminates when a charge power level at the present point, which has been lowered in phases, reaches a preset critical value.

10. The apparatus for charging a battery according to claim 9, wherein the critical value is 0 W.

11. The apparatus for charging a battery according to claim 1, wherein in the early charging mode, the battery is charged by means of a constant-power manner, a constant-current manner, a constant-voltage manner, or their mixtures.

12. The apparatus for charging a battery according to claim 1, wherein, in the late charging mode, the control unit outputs the charge control signal for lowering both the voltage and the charge current.

13. The apparatus for charging a battery according to claim 1, wherein, in the late charging mode, the control unit outputs the charge control signal for lowering the charge current.

14. The apparatus for charging a battery according to claim 1, further comprising a memory unit that stores the cut-off voltage, the phased decrement of the charge power, and a charge power condition when the late charging mode terminates.

15. A battery driving system, comprising:
a battery;
a load for receiving power from the battery; and
an apparatus for charging a battery, defined in claim 1.

16. The battery driving system according to claim 15, wherein the load is an electric-driven unit or a portable device.

17. A battery pack, comprising:
a battery; and
an apparatus for charging a battery, defined in claim 1.

18. A method for charging a battery, comprising:
an early charging stage in which a battery is charged until a voltage of the battery rises to a preset cut-off voltage (Vc); and
a late charging stage in which the battery is charged while lowering a charge power in phases,
wherein a point of lowering the charge power in phases is associated with a point at which the voltage of the battery reaches the cut-off voltage again by the lowered charge power,
wherein the late charging stage lowers the charge power in phases by lowering both a charge voltage and a charge current or by lowering the charge voltage,
wherein, when outputting a charge control signal for lowering both the charge voltage and the charge current, the late charging stage lowers the charge power in phases so that the charge voltage approaches the cut-off voltage, and
wherein, when outputting the charge control signal for lowering the charge current, the late charging stage lowers the charge power in phases so that the charge voltage rises according to a preset voltage range.

19. The method for charging a battery according to claim 18, wherein the cut-off voltage (Vc) is set higher than an open circuit voltage when the battery is fully charged.

20. The method for charging a battery according to claim 18, wherein the cut-off voltage (Vc) is set so that an open circuit voltage when the battery finishes charging is 95% or above an open circuit voltage when the battery is fully charged.

21. The method for charging a battery according to claim 18, wherein in the late charging stage, a phased decrement ($\Delta P$) of the charge power is $\frac{1}{5}$ or below a charge power (CP0) applied when the early charging stage terminates.

22. The method for charging a battery according to claim 18, wherein in the late charging stage, a phased decrement ($\Delta P$) of the charge power is constant.

23. The method for charging a battery according to claim 18, wherein in the late charging stage, a phased decrement ($\Delta P$) of the charge power proportionally increases or decreases.

24. The method for charging a battery according to claim 18, wherein the late charging stage terminates when a charge power level at the present point, which has been lowered in phases, reaches a preset critical value.

25. The method for charging a battery according to claim 24, wherein the critical value is 0 W.

26. The method for charging a battery according to claim 18, wherein in the late charging stage, a phased decrement ($\Delta P$) of the charge power is constant, and
wherein the late charging stage terminates when a charge power level at the present point, which has been lowered in phases, reaches a preset critical value.

27. The method for charging a battery according to claim 26, wherein the critical value is 0 W.

28. The method for charging a battery according to claim 18, wherein in the early charging stage, the battery is charged by means of a constant-power manner, a constant-current manner, a constant-voltage manner, or their mixtures.

29. The method for charging a battery according to claim 18, wherein, in the late charging state, outputting the control signal for lowering both the charge voltage and the charge current, the late charging stage lowers the charge power in phases so that the charge voltage approaches the cut-off voltage.

30. The method for charging a battery according to claim 18, wherein, in the late charging state, outputting the control signal for lowering the charge current, the late charging stage lowers the charge power in phases so that the charge voltage rises according to a preset voltage range.

31. The method for charging a battery according to claim 18, further comprising:
storing the cut-off voltage, the phased decrement of the charge power, and a charge power condition when the late charging stage terminates.

\* \* \* \* \*